United States Patent
Choi et al.

(10) Patent No.: US 8,339,567 B2
(45) Date of Patent: Dec. 25, 2012

(54) RADIAL-SHAPED LIQUID CRYSTAL COMPOUND, AND OPTICAL FILM AND LIQUID CRYSTAL DISPLAY DEVICE COMPRISING THE SAME

(75) Inventors: Bum-Gyu Choi, Daejeon (KR); Min-Jin Ko, Daejeon (KR); Myung-Sun Moon, Daejeon (KR); Jae-Ho Cheong, Daejeon (KR); Dae-Ho Kang, Daejeon (KR); Ki-Youl Lee, Daejeon (KR); Yun-Bong Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 117 days.

(21) Appl. No.: 13/002,477

(22) PCT Filed: Jul. 3, 2009

(86) PCT No.: PCT/KR2009/003653
§ 371 (c)(1),
(2), (4) Date: Mar. 25, 2011

(87) PCT Pub. No.: WO2010/002223
PCT Pub. Date: Jan. 7, 2010

(65) Prior Publication Data
US 2011/0181826 A1    Jul. 28, 2011

(30) Foreign Application Priority Data

Jul. 4, 2008 (KR) .................. 10-2008-0065034

(51) Int. Cl.
*G02F 1/13* (2006.01)
*C09K 19/02* (2006.01)

(52) U.S. Cl. ....................... 349/193; 349/182

(58) Field of Classification Search ............ 349/182, 349/193
See application file for complete search history.

(56) References Cited

U.S. PATENT DOCUMENTS

| 6,156,858 | A  | * | 12/2000 | Keoshkerian et al. | 526/204 |
| 7,008,990 | B2 |   | 3/2006  | Raether et al. | |
| 7,282,264 | B2 | * | 10/2007 | Ddamulira et al. | 428/403 |
| 7,524,910 | B2 | * | 4/2009  | Jiang et al. | 526/348 |
| 7,550,528 | B2 | * | 6/2009  | Abhari et al. | 524/487 |
| 7,592,409 | B2 | * | 9/2009  | Parker et al. | 526/347 |
| 7,700,707 | B2 | * | 4/2010  | Abhari et al. | 526/348 |
| 7,767,775 | B2 | * | 8/2010  | Parker et al. | 526/204 |
| 8,071,687 | B2 | * | 12/2011 | Jiang et al. | 525/240 |
| 8,088,867 | B2 | * | 1/2012  | Jiang et al. | 525/240 |
| 8,178,637 | B2 | * | 5/2012  | Parker et al. | 526/204 |

FOREIGN PATENT DOCUMENTS

| JP | 2001-354965 | 12/2001 |
| JP | 3434346 | 5/2003 |
| JP | 2005-208414 | 8/2005 |
| JP | 2007-279705 | 10/2007 |

* cited by examiner

*Primary Examiner* — Rhonda Peace
(74) *Attorney, Agent, or Firm* — McKenna Long & Aldridge, LLP

(57) ABSTRACT

The present invention relates to a radial-shaped liquid crystal compound, and an optical film and a liquid crystal display device comprising the same. Particularly the present invention provides a compound represented by Chemical Formula 1 comprising a radial-shaped core of tetraphenyl ethylene in which four phenyl groups are bonded to an ethylene group, and makes it possible to provide an optical film which can minimize the change of color according to viewing angle and has an improved contrast ratio and high refractive anisotropy, and a liquid crystal display device comprising the same, by using the compound.

23 Claims, No Drawings

RADIAL-SHAPED LIQUID CRYSTAL COMPOUND, AND OPTICAL FILM AND LIQUID CRYSTAL DISPLAY DEVICE COMPRISING THE SAME

This application is a National Stage Entry of International Application No. PCT/KR2009/003653, filed Jul. 3, 2009, and claims the benefit of Korean Application No. 10-2008-0065034, filed on Jul. 4, 2008, which is hereby incorporated by reference for all purposes as if fully set forth herein.

TECHNICAL FIELD

The present invention relates to a radial-shaped liquid crystal compound, and an optical film and a liquid crystal display device comprising the same, and particularly, to a noble liquid crystal compound which can be applied to the preparation of an optical film which can minimize the change of color according to viewing angle and has an improved contrast ratio and high refractive anisotropy, and a liquid crystal display device.

PRIOR ART

Liquid crystal display (LCD) device is largely being applied to products such as a laptop computer, a cell phone, a television, a monitor, and the like, because of its light weight, thin display characteristic, and low power consumption.

However, the LCD device has a disadvantage of viewing angle dependence, namely, the color or brightness changes according to viewing direction or angle. Furthermore, there is a problem of that as the display screen becomes bigger, the viewing angle becomes narrower. The viewing angle of prior CRT device reaches almost 180°, but the viewing angle of TFT-LCD which is not compensated in viewing angle is only ±50°.

As the method of resolving such problems, a multi-domain method which controls the alignment by dividing pixels inside the liquid crystal cell, a method of controlling voltage, and a method of using an optical compensation film have been known.

Such viewing angle dependence of LCD devices is due to that the birefringence effect when the light is diagonally entered to the panel is different from the effect when the light is entered vertically, and an optical compensation film method using retardation films having the reverse birefringence to the panel in such a manner of attaching the films to the panel back and forth is mainly being used, and high-performance liquid crystal compensation films are needed more and more as the display panel becomes bigger.

DETAILED DESCRIPTION OF THE INVENTION

[Technical Object]

It is an aspect of the present invention to provide a noble liquid crystal compound which can be used as a material for an optical film which can minimize the change of color according to viewing angle and has an improved contrast ratio and high refractive anisotropy.

It is another aspect of the present invention to provide a liquid crystal composition including said compound, an optical film for LCD prepared by using said compound, and a LCD device prepared by using said compound.

It is still another aspect of the present invention to provide a method of preparing the liquid crystal compound, and a method of preparing the optical film.

[Technical Solution]

The present invention provides a compound represented by Chemical Formula 1. The compound represented by Chemical Formula 1 is a radial-shaped liquid crystal compound:

Chemical Formula 1

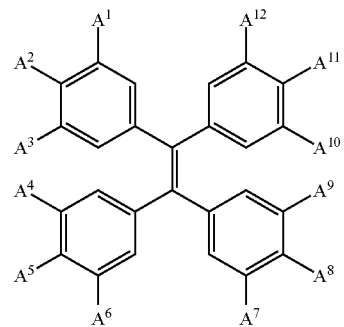

wherein, $A^1$ to $A^{12}$ are independently —H or a substituent represented by chemical formula

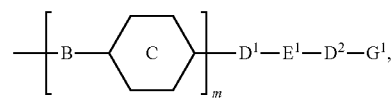

and at least one of $A^1$ to $A^{12}$ is a substituent represented by chemical formula

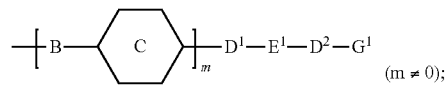

(m ≠ 0);

B is —O—, —NH—, —(CH$_2$)$_n$—, —O(CH$_2$)$_n$O—, —NH(CH$_2$)$_n$NH—, —O(CH$_2$)$_n$NH—, —NH(CH$_2$)$_n$O—, —CH=CH—, —C≡C—, —C(=O)O—, —OC(=O)—, or —C(=O)—, and n is an integer of 0~6;

ring C is

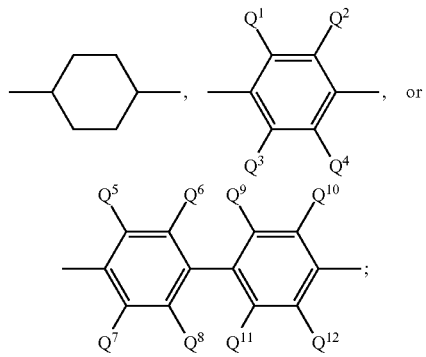

$Q^1$ to $Q^{12}$ are independently —H, —F, —Cl, —Br, —I, —CN, —CF$_3$, —OH, a $C_1$~$C_{12}$ alkyl, a $C_1$~$C_{12}$ alkoxy, or a substituent represented by chemical formula -D$^3$-E$^2$-D$^4$-G$^2$;

m is an integer of 0~2;

$D^1$, $D^2$, $D^3$, and $D^4$ are independently —O—, —NH—, or —(CH$_2$)$_p$—, and p is an integer of 0~5;

$E^1$ and $E^2$ are independently a $C_1$~$C_{12}$ alkylene, a $C_2$~$C_{12}$ alkenylene, —$(CH_2CH_2O)_q$—, —$(CH_2CHCH_3O)_q$—, or —$(CHCH_3CH_2O)_q$—, and q is an integer of 1~5;

$G^1$ and $G^2$ are independently —H,

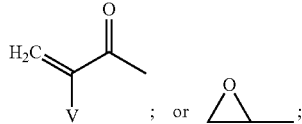

and

V is —H, —$CH_3$, —$CH_2CH_3$, —F, —Cl, —Br, or —$CF_3$.

The present invention also provides a liquid crystal composition including the compound represented by Chemical Formula 1, and an optical film prepared by using the liquid crystal composition. Preferably, the optical film of the present invention is a compensation film for LCD.

The present invention also provides a LCD device including the optical film.

The present invention also provides a method of preparing the radial-shaped liquid crystal compound, and a method of preparing the optical film.

Hereinafter, the radial-shaped liquid crystal compound and so on according to embodiment of the present invention is explained in more detail.

According to one embodiment of the invention, the compound of Chemical Formula 1 is a radial-shaped compound having a radial-shaped core of tetraphenyl ethylene in which four phenyl groups are bonded to an ethylene group and one or more substituents represented by —[B-ring C]$_m$-$D^1$-$E^1$-$D^2$-$G^1$, where m≠0, are introduced to the phenyl groups of the core. Furthermore, the compound according to the embodiment represented by Chemical Formula 1 is a liquid crystal compound.

As supported by Examples disclosed below, the present inventors identified that the optical film prepared by using the liquid crystal compound minimizes the color change according to viewing angle, and has improved contrast ratio and high refractive anisotropy, because of the structural characteristics of the liquid crystal compound having the radial-shaped core of tetraphenyl ethylene.

Meanwhile, in Chemical Formula 1, the $C_2$~$C_{12}$ alkenylene of $E^1$ and $E^2$ may be —CH═CH—, —CH═$CCH_3$—, —$CH_2$CH═CH—, —CH═CH$CH_2$CH$_2$—, —$CH_2$CH═CH$CH_2$—, —$CH_2$$CH_2$CH═CH—, —CH═CH$CH_2$$CH_2$$CH_2$—, —$CH_2$CH═CH$CH_2$$CH_2$—, —$CH_2$$CH_2$CH═CH$CH_2$—, or —$CH_2$$CH_2$$CH_2$CH═CH—, and it is not limited to or by this.

Preferably, the B may be —OC(═O)—; and ring C may be

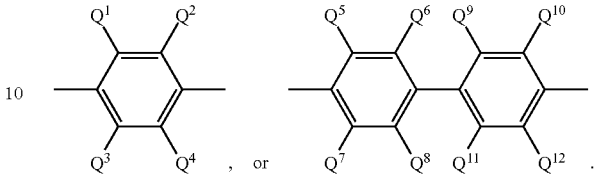

When the core compound including above substituent is used for preparing the compound represented by Chemical Formula 1, various derivatives of nematic liquid crystal compound can be synthesized, and it is advantageous in the point of broadening the liquid crystal temperature range of the liquid crystal compound. Namely, the compound represented by Chemical Formula 1 having above substituent show wide liquid crystal temperature range.

Furthermore, the liquid crystal compound according to the embodiment may have same structure of the substituents including phenylene group of the core with ethylene of the radial-shaped core of tetraphenyl ethylene as the center, or may have a trans-structure with ethylene as the center.

Namely, it is preferable that $A^1$=$A^7$, $A^2$=$A^8$, $A^3$=$A^9$, $A^4$=$A^{10}$, $A^5$=$A^{11}$, $A^6$=$A^{12}$, and it is more preferable that $A^2$=$A^8$, $A^5$=$A^{11}$, and $A^1$, $A^3$, $A^4$, $A^6$, $A^7$, $A^9$, $A^{10}$, and $A^{12}$ are —H. As disclosed above, when the structures of the substituents including phenylene group of the core of the liquid crystal compound are same each other with ethylene of the radial-shaped core of tetraphenyl ethylene as the center, the molecule has a symmetric structure with ethylene as the center, and the probability of showing a liquid crystal phase is higher than an asymmetric molecular structure. Furthermore, when the functional end groups are reduced to two groups and the structure of the substituents becomes a trans-structure with ethylene of the radial-shaped core of tetraphenyl ethylene of the liquid crystal compound as the center, it may be more preferable form for forming a film because it is possible to increase the stability of the compound.

Hereinafter, specific examples of the compound represented by Chemical Formula 1 according to the embodiment of the present invention are shown, but the present invention is not limited to or by the examples.

[Compound Example 1]

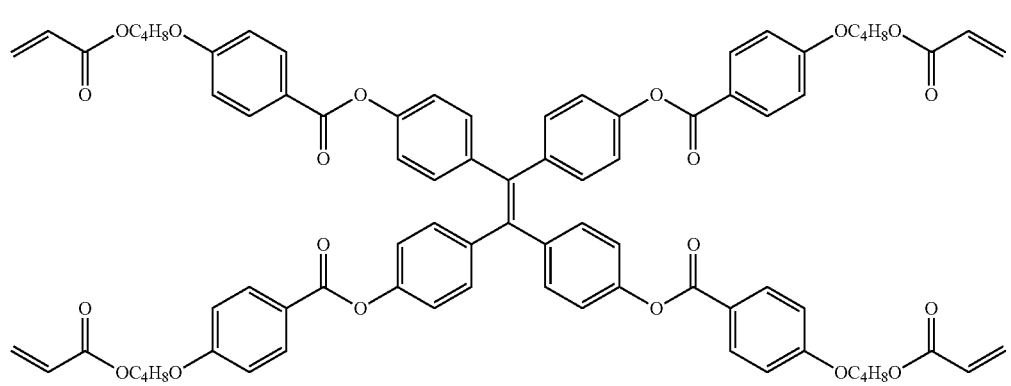

-continued
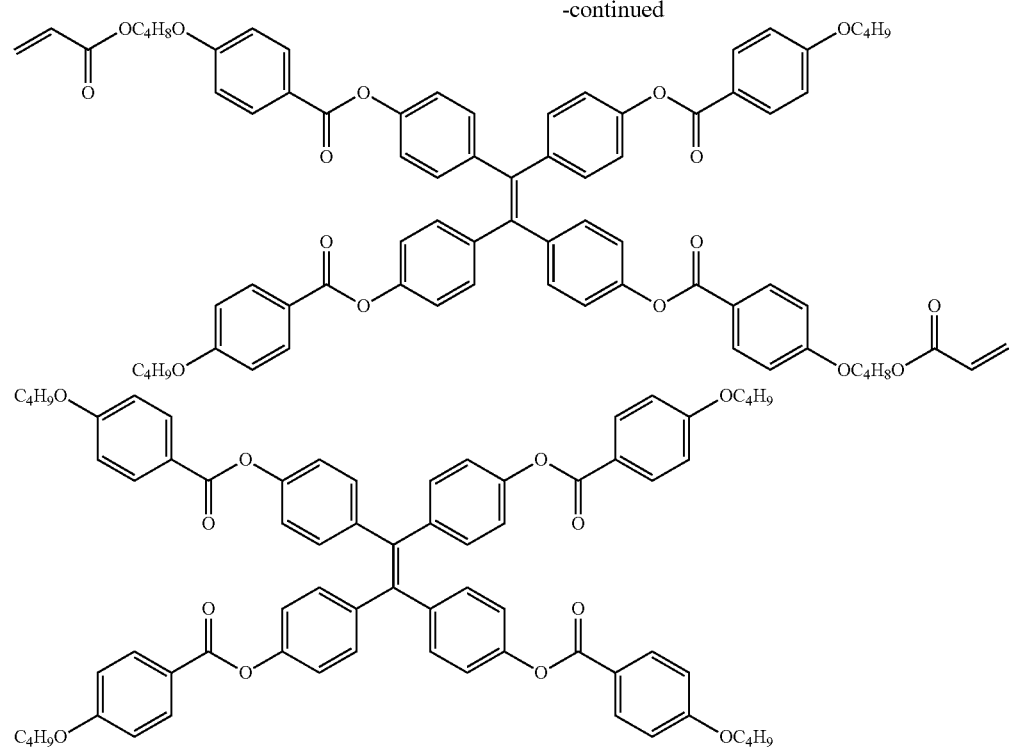
[Compound Example 2]
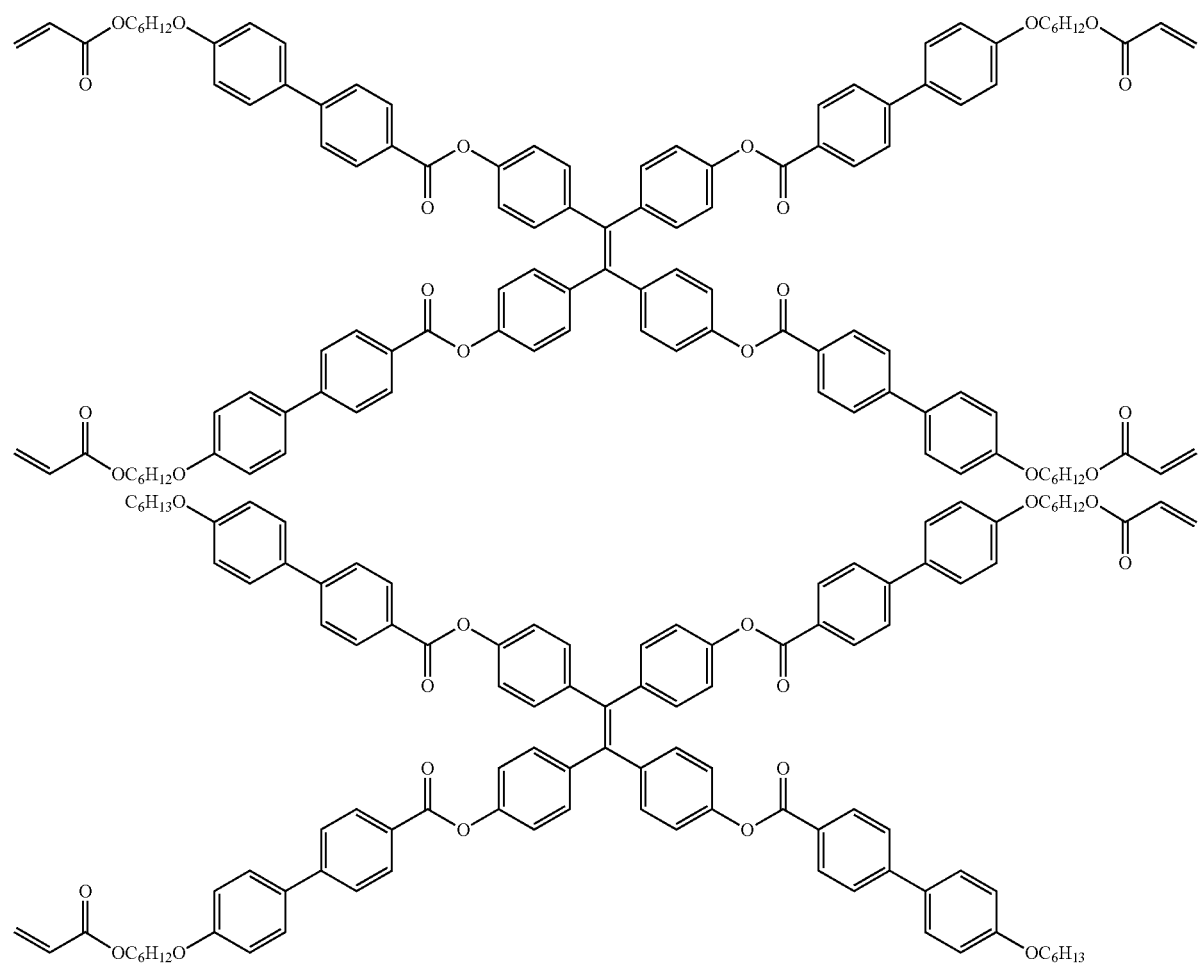

[Compound Example 3]
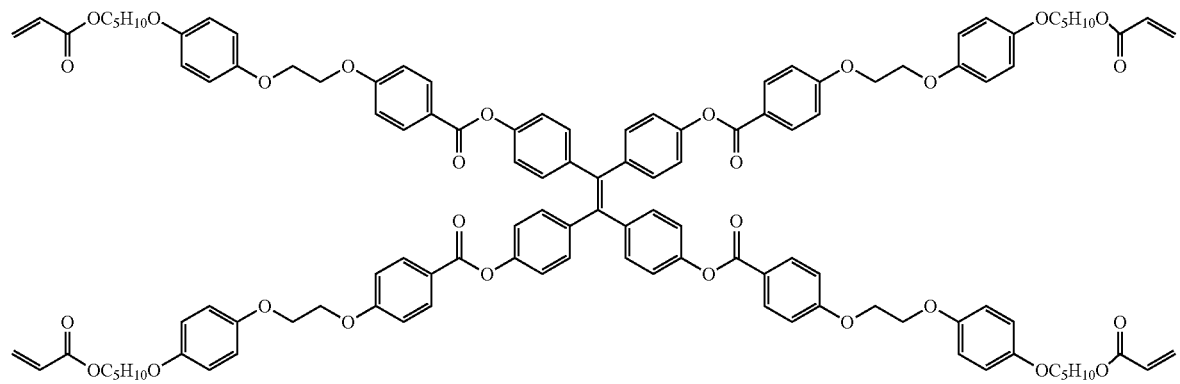
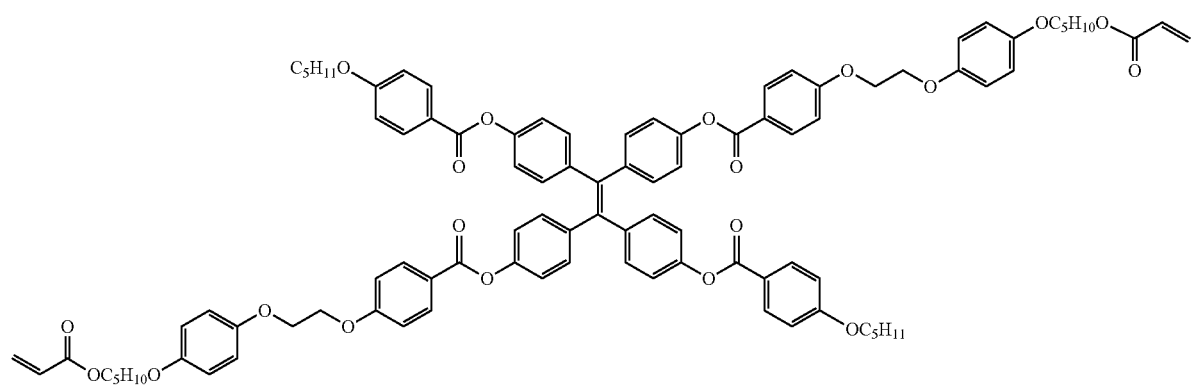
[Compound Example 4]
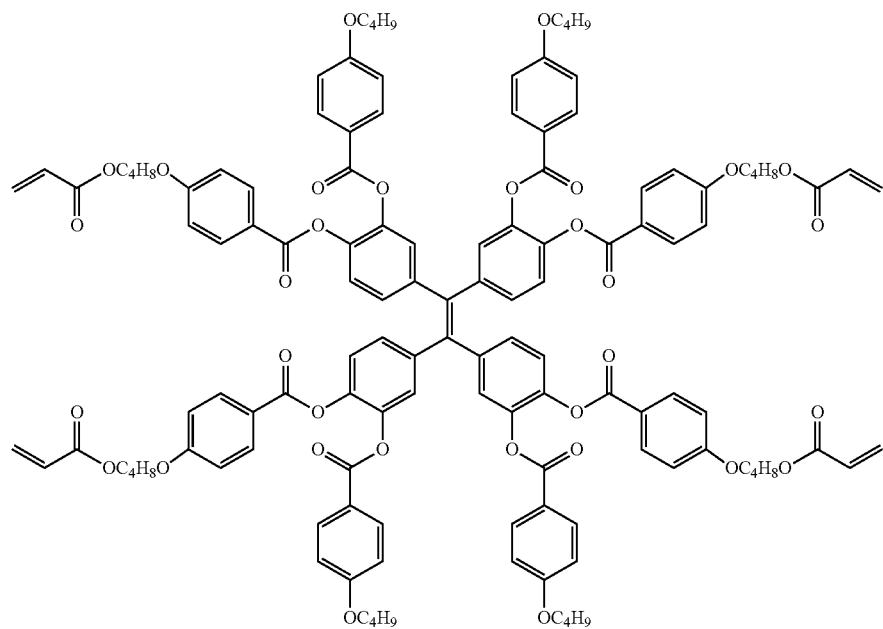

[Compound Example 5]

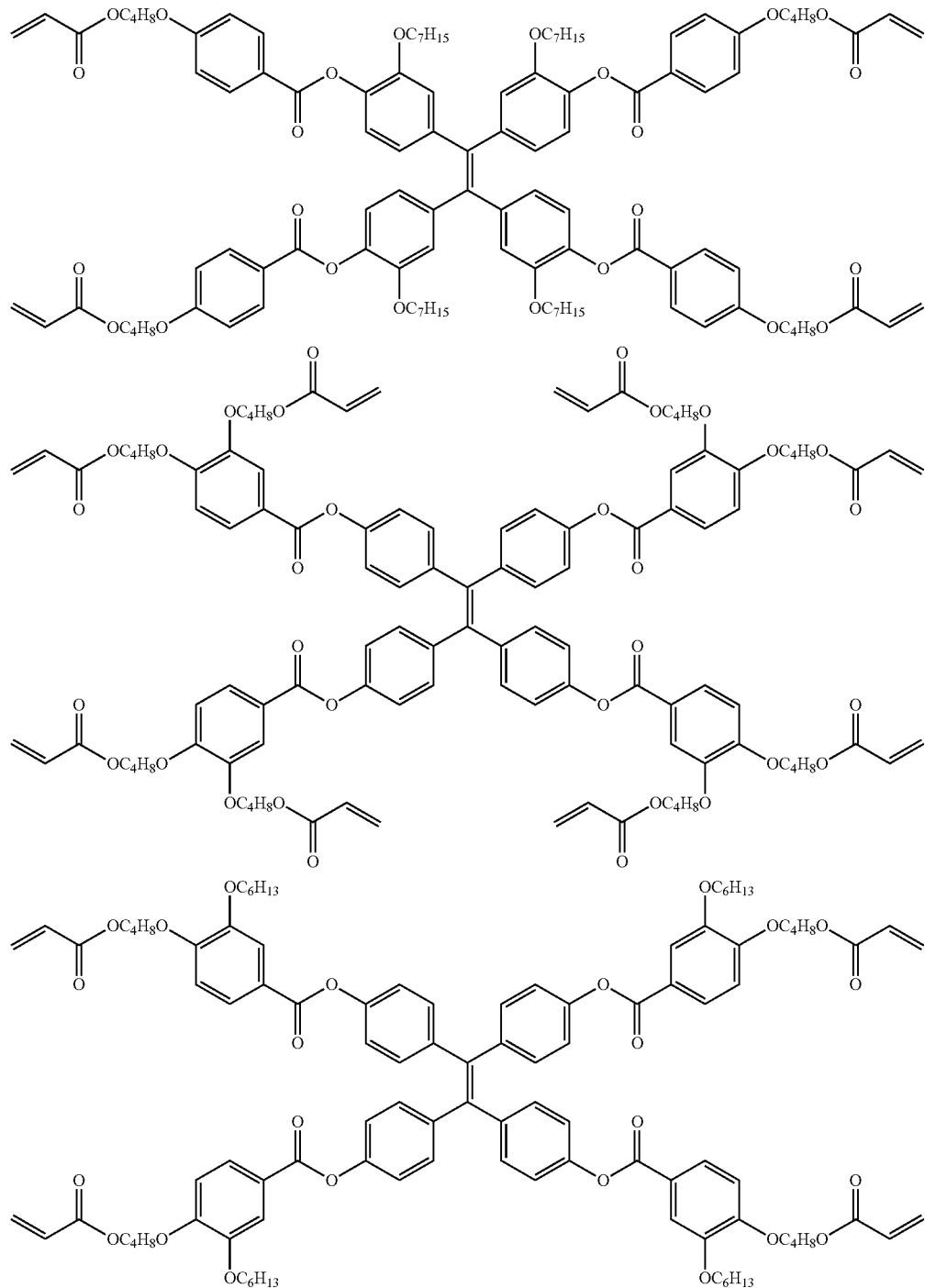

On the other hand, the present invention provides a method of preparing the compound represented by Chemical Formula 1 according to another embodiment. Particularly, the method of preparing the compound represented by Chemical Formula 1 may include the steps of: preparing a compound represented by the following Chemical Formula 3 by reacting 2 molecules of a compound represented by the following Chemical Formula 2; preparing a core compound represented by Chemical Formula 4 by substituting the alkoxy group of the compound represented by Chemical Formula 3 with hydroxyl group; and substituting the hydroxyl group of the core compound represented by Chemical Formula 4 with

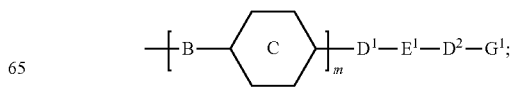

Chemical Formula 2

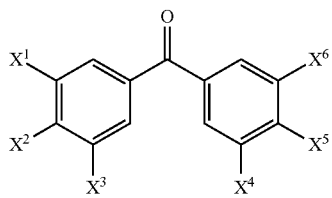

Chemical Formula 3

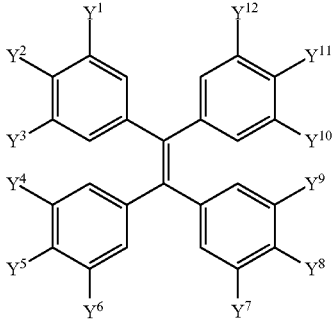

Chemical Formula 4

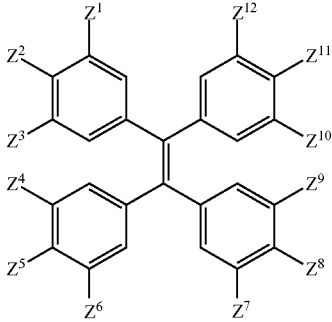

wherein, $X^1$ to $X^6$ of Chemical Formula 2 are independently hydrogen, or a $C_1$~$C_3$ alkoxy group, $Y^1$ to $Y^{12}$ of Chemical Formula 3 are independently hydrogen, or a $C_1$~$C_3$ alkoxy, and $Z^1$ to $Z^{12}$ are independently hydrogen, or hydroxyl group.

At this time, $X^1$ to $X^6$ of the compound of Chemical Formula 2 which is used for preparing the liquid crystal compound may preferably be methoxy group for ease of reaction or preparation of the reacting compounds. Furthermore, each reaction step for preparing the liquid crystal compound of Chemical Formula 1 can be carried out under presence of an organic solvent and/or a catalyst, and the kinds of the organic solvent and the catalyst are not limited in the present invention.

And, said each reaction step may be carried out under a conventional reaction condition which is obvious to a person skilled in a related art, according to the kinds of the reactant and the product to be obtained. For example, the reaction of two molecules of the compound represented by Chemical Formula 2, i.e., dimethoxy benzophenone, for preparing the compound represented by Chemical Formula 3, i.e., tetraalkoxyphenyl ethylene (more specifically, tetramethoxyphenyl ethylene) may be carried out under presence of a base such as titanium tetrachloride, zinc, pyridine, and the like. In this case, the tetraalkoxyphenyl ethylene can be obtained by that ketone groups of two dialkoxy benzophenone molecules combine each other and form an ethylene group. Furthermore, the substituting reaction of the alkoxy group with hydroxyl group may be carried out under presence of boron tribromide ($BBr_3$) according to a conventional reaction condition.

In addition to, the step of substituting one or more hydroxyl group of the core compound with

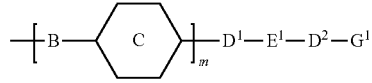

may be carried out under the condition of an acylation reaction, an alkylation reaction, an amination reaction, or an etherification reaction, according to the kind of functional group of —B—. Furthermore, when it is needed that two or more substituents are introduced to the hydroxyl group of the core compound, it is naturally possible to carry out the substitution reaction with

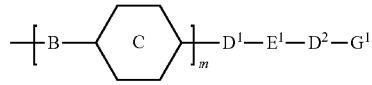

separately in two steps, or to carry out the substitution reaction in one step by using a mixture of two or more reactants if it is possible.

The liquid crystal compound of Chemical Formula 1 can be easily prepared when the substitution reaction with

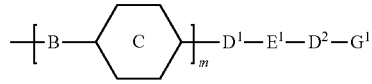

is finished, and more specific example about the preparation of such liquid crystal compound and the reaction conditions are described in below Examples.

The present invention also provides a liquid crystal composition including the compound represented by Chemical Formula 1 as the liquid crystal compound according to still another embodiment. The liquid crystal composition may include one or more kinds of the liquid crystal compound represented by Chemical Formula 1, and it can be obtained according to a conventional method of preparing a liquid crystal composition. Typically, it can be prepared by dissolving various components each other at room temperature or high temperature.

At this time, the compound of Chemical Formula 1 included in the liquid crystal composition may be 0.1 to 99.9 weight %, preferably 1 to 80 weight %, in total liquid crystal composition.

The liquid crystal composition according to the embodiment may include various compounds which do not disturb the liquid crystal property and can be mixed therewith in addition to the liquid crystal compound of Chemical Formula 1 as occasion demands. As the examples of the compounds, a polymerizable liquid crystal compound which is used in a conventional liquid crystal composition, a polymerizable non-liquid crystal compound, and/or a polymer may be used, and the constituent ratio can be varied according to the purpose. The polymerizable compounds are preferably the compounds having a polymerizable group such as vinyl group, vinyloxy group, acryl group, and methacryl group.

The liquid crystal composition according to the embodiment may include a photoreaction initiator as occasion demands. The photoreaction initiator is not limited particularly, and the initiator well known in the related art may be used. As the unrestricted examples of the initiator, benzoyl ether, benzoylisobutyl ether, benzoylisopropyl ether, benzophenone, acetophenone, 4-benzoyl-4'-methyldiphenyl sulfide, benzylmethyl ketal, dimethylaminomethyl benzoate, 3,3'-dimethyl-4-methoxy benzophenone, methylbenzoyl formate, 2-methyl-1-(4-methylthio)phenyl)-2-morpholinylpropan-1-one, 2-benzyl-2-dimethylamino-1-(4-morpholinophenyl)-butan-1-one, 1-hydroxycyclohexyl phenyl ketone, Irgacure series, and the like may be used. Furthermore, the photoreaction initiator may be included in an amount of 0.001 to 20 parts by weight, preferably 0.01 to 10 parts by weight per 100 parts by weight of total liquid crystal composition.

The liquid crystal composition according to the embodiment may further include an organic solvent as occasion demands. As the organic solvent is included in the liquid crystal composition, it becomes easy to coat the liquid crystal composition on a substrate such as a film.

The organic solvent is not limited particularly and the solvent known in the related art may be used. As unrestricted examples of the organic solvent, a hydrocarbon-type such as cyclohexane, cyclopentane, benzene, toluene, xylene, butylbenzene, and the like; a ketone-type such as acetone, methylethylketone, methylisobutylketone, cyclohexanone, and the like; an ester-type such as ethyl acetate, ethyleneglycol monomethylether acetate, propyleneglycol monomethylether acetate, gamma-butyrolactone, and the like; an amide-type such as 2-pyrrolidone, N-methyl-2-pyrrolidone, dimethylform amide, dimethylacetamide, and the like; a halogen-type such as chloroform, dichloromethane, carbon tetrachloride, dichloroethane, tetrachloroethane, tetrachloroethylene, chlorobenzene, and the like; an alcohol-type such as t-butyl alcohol, diacetone alcohol, glycerine, monoacetine, ethylene glycol, triethylene glycol, hexylene glycol, ethyleneglycol monomethyl ether, and the like; a phenol-type such as phenol, para-chlorophenol, and the like; an ether-type such as methoxy benzene, 1,2-dimethoxy benzene, diethyleneglycol dimethyl ether, ethyleneglycol dimethyl ether, ethyleneglycol diethyl ether, propyleneglycol dimethyl ether, propyleneglycol diethyl ether, diethyleneglycol dimethyl ether, propyleneglycol diethyl ether, diethyleneglycol dimethyl ether, diethyleneglycol diethyl ether, dipropyleneglycol dimethyl ether, dipropyleneglycol diethyl ether, and the like may be used. The organic solvents can be used solely or together by mixing two or more of them, and the amount used is not limited particularly.

The liquid crystal composition according to the embodiment may include a surfactant as occasion demands. Furthermore, the liquid crystal composition may include a chiral dopant suppressing helical structure and backward distortion of the liquid crystal, a leveling agent, and the like, as other additives.

The present invention provides a method of preparing an optical film by using above liquid crystal composition, according to still another embodiment. Specifically, the method of preparing the optical film includes the steps of coating above liquid crystal composition on a substrate; drying the substrate coated with the liquid crystal composition; and hardening the dried substrate.

At this time, the optical film is what an optical anisotropic liquid crystal film is formed on a substrate, and the alignment state of liquid crystal in the liquid crystal film can be controlled by properly selecting the kind and the amount of the liquid crystal compound and the additional compounds included therein. Furthermore, any substrate on which an optical anisotropic liquid crystal film can be formed may be used unrestrictedly. As such substrate, a polymeric film, a metal, and a glass may be used.

The substrate may be aligned and include an alignment layer formed on the substrate, before the liquid crystal compound or the liquid crystal composition is coated. As an unrestricted example of the material of alignment layer, polyimide, polyamide, polyacrylate, polyvinylalcohol, and the like may be used.

Some of the substrates show the sufficient performance for aligning the liquid crystal compound and can be immediately used, however, the substrate may be used after treating the surface by the method of rubbing, drawing, polarized light irradiation, or skew ray irradiation for the improvement of aligning performance, before the liquid crystal compound or the liquid crystal composition is coated.

Here, the rubbing treatment may be directly carried out on the substrate, or may be carried out by rubbing the alignment layer after forming an alignment layer on the substrate beforehand.

The process of coating the liquid crystal composition on the substrate can be carried out according to a conventional method. As unrestricted examples, a spin coating method, a roll coating method, a printing method, a dip-drawing method, a curtain coating method, a die coating method, a dip coating method, a bar coating method, and the like may be used.

The drying process may be carried out by a conventional method, and the liquid crystal compound is aligned during the drying process or an additional heating process after the drying process.

The hardening process may be carried out by irradiating a beam to the coated liquid crystal composition and/or heat-treating the same. The polymerization reaction of the polymerizable groups of the polymerizable compounds occurs during the processes, and the liquid crystal compound bonds to the substrate in a state of fixed alignment and the crystal film which is an optical anisotropic liquid crystal layer can be formed. The kind of the light source used in the hardening process is not limited particularly, and the light may be an electron beam, ultraviolet rays, visible rays, infrared rays, and the like. At this time, ultraviolet rays may be preferably used, and it is preferable that the irradiating energy is in the range of 20 mJ/cm$^2$~50 J/cm$^2$. In the case of irradiating ultraviolet rays with the irradiating energy of above range, though the irradiating time is unrestricted, the hardening process can be finished within 1 minute. Furthermore, the heat-treating condition is not limited specifically, however, it may be generally carried out at 10 to 200° C. for 3 seconds to 30 minutes.

The optical film may also be prepared by a different method from the method according to above embodiment, specifically the method includes the steps of coating above liquid crystal composition on a peelable film; drying the peelable film coated with the liquid crystal composition; forming a liquid crystal film by hardening the dried peelable film; and transferring the liquid crystal film to a substrate.

At this time, the steps of coating, drying, and hardening of the method are same as in above embodiment, except that the liquid crystal film is transferred to a substrate by using a gluing agent or an adhesive after preparing the liquid crystal film by coating the liquid crystal composition on the peelable film, and drying and hardening the same.

Meanwhile, the optical film prepared by above method may be used to an optical compensation film, or a polarizer using the optical compensation film and these may be installed in a liquid crystal display device. The film may preferably be used to a compensation film for LCD.

The optical film prepared by the method of the present invention can minimize the change of color according to viewing angle and has an improved contrast ratio and high refractive anisotropy. Specifically, the present inventors confirmed that the optical film prepared by using the liquid crystal compound (or liquid crystal composition) according to the Example of the present invention has the average angle of inclination β of 5° to 50°, which is measured by using Axoscan, an apparatus for polarization measurement.

The liquid crystal display device may be a TN mode display device, a STN mode display device, or an OCB mode display device, but is not limited to them.

EXAMPLES

Hereinafter, the present invention is explained in more detail by referring the following Examples. However, the Examples are just for presenting the present invention, and the present invention is not limited to or by them.

Synthesis Example

Synthesis of Radial-Shaped Core of Tetraphenyl Ethylene

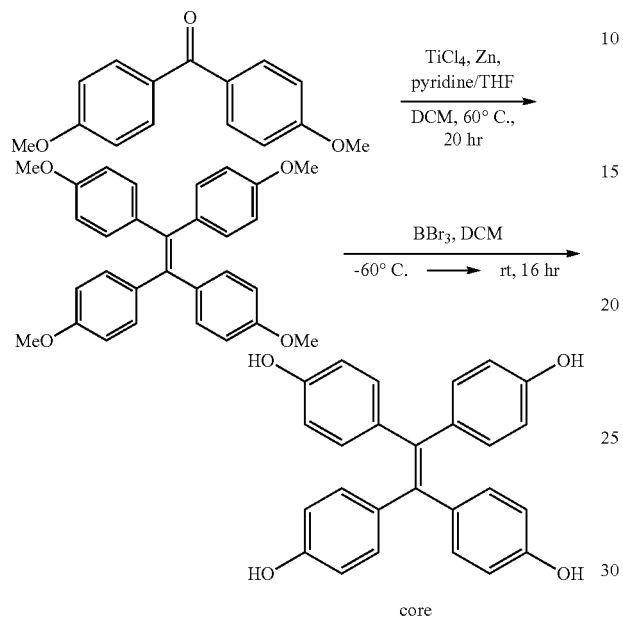

core 1.1 equivalent of $TiCl_4$ was dissolved in THF in a flame dried two-neck flask, and the solution was cooled to 0° C. 2.2 equivalent of Zn powder and 0.89 equivalent of pyridine were added thereto in order. A solution in which 4,4'-dimethoxybenzophenone is dissolved in THF and DCM was slowly added thereto, and the reaction was carried out at 60° C. for 20 hours. The temperature of the solution was cooled to room temperature, and 10% $K_2CO_3$ and water were added thereto in order and the product was extracted by using DCM. The product was purified by using a flash chromatography. The compound obtained by above processes was dissolved again in DCM and the temperature of the solution was cooled to −60° C. After 5.0 equivalent of $BBr_3$ was slowly added thereto and the solution was reacted at the same temperature for 1 hour, the reaction was further carried out at room temperature for 16 hours. After the reaction, the solution was cooled to 0° C. and water was added thereto dropwise, the prepared solid was filtered, and washed by using water and DCM. The obtained solid was purified by a recrystallization method with EtOH/water, and the core compound was obtained.

$^1$HNMR (500 MHz, acetone-d6): δ 6.59 (d, 8H), 6.83 (d, 8H), 8.20 (s, 4H).

Preparation Examples

Synthesis of Liquid Crystal Compound

Preparation Example 1

Synthesis of Liquid Crystal Compound 1

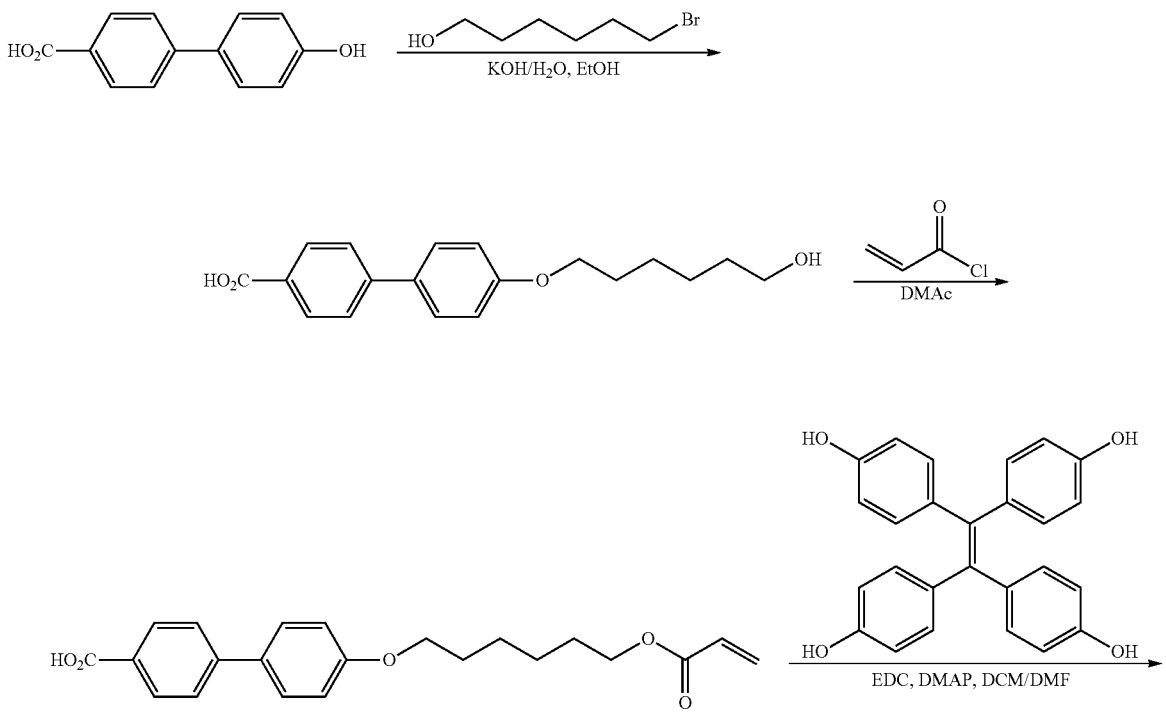

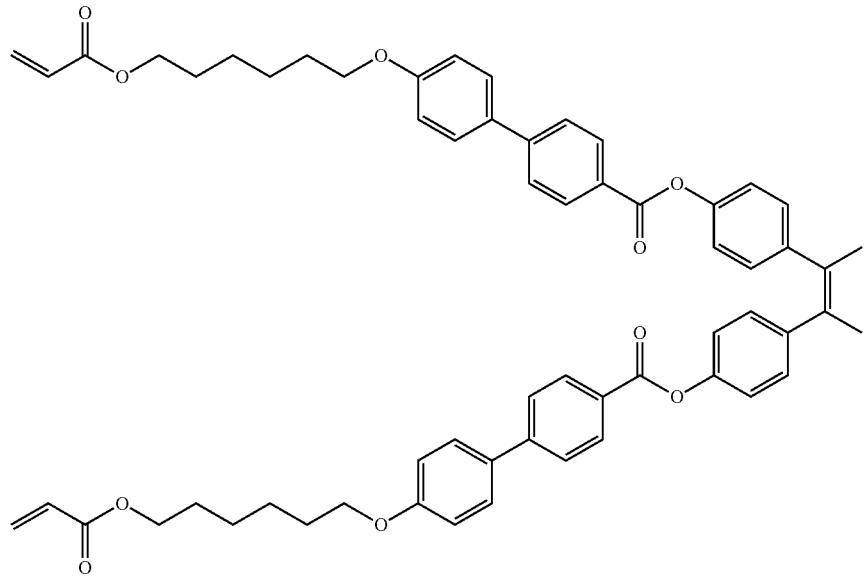

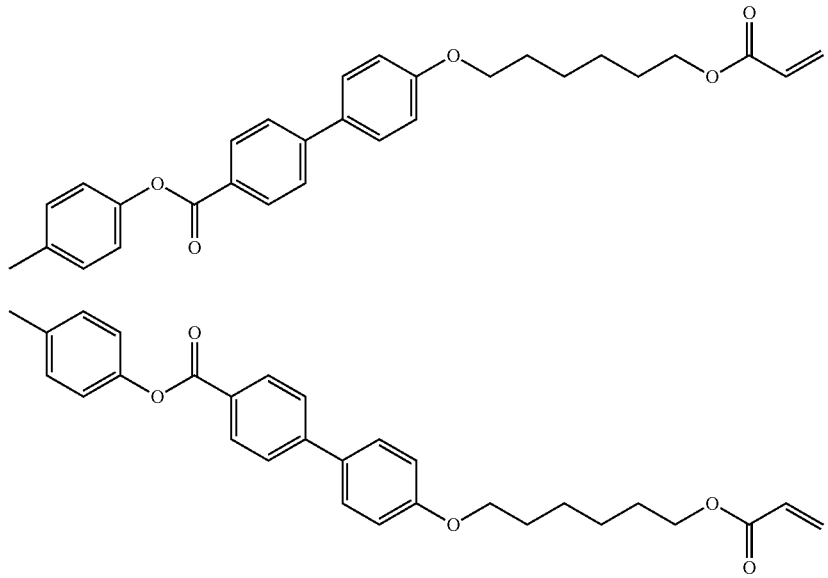

1

2.5 equivalent of KOH and water were added to a solution in which 4-(4-Hydroxy phenyl)benzoic acid is dissolved in EtOH, and the temperature of the mixture solution was adjusted to 80° C. 1.2 equivalent of 6-bromo hexanol was slowly added to the solution and the reaction was carried out for 20 hours. The prepared solid was filtered, and washed with hexane. The compound obtained by above processes was dissolved in DMAc (dimethyl acetamide), 1.2 equivalent of acryloyl chloride was added thereto, and the reaction was carried out for 3 hours. After adding excess water to the reacted solution, the prepared solid was filtered, washed with water many times, and dried. The obtained solid was dissolved in DCM (dichloromethane)/ DMF(dimethylformamide) (weight ratio 10:1), EDC (1-Ethyl-3-(3-dimethylaminopropyl)-carbodiimide Hydrochloride) and DMAP (4-(Dimethylamino)pyridine) were added thereto in order, and the solution was stirred for 30 minutes. The core compound prepared in Synthesis Example was added to the solution, and the reaction was carried out for 18 hours. After the reacted solution was diluted by using DCM and washed with water, the solvents were eliminated by a vacuum distiller. The product was purified by using a flash chromatography and the compound 1 was obtained.

$^1$HNMR (500 MHz, CDCl$_3$): δ 1.45~1.58 (m, 16H), 1.72 (m, 8H), 1.83 (m, 8H), 4.02 (t, 8H), 4.10 (t, 8H), 5.82 (dd, 4H), 6.14 (dd, 4H), 6.42 (dd, 4H), 6.99 (d, 8H), 7.08 (d, 8H), 7.19 (d, 8H), 7.59 (d, 8H), 7.67 (d, 8H), 8.24 (d, 8H).

Nematic phase temperature range: 145° C.~156° C.

Preparation Example 2

Synthesis of Liquid Crystal Compound 2

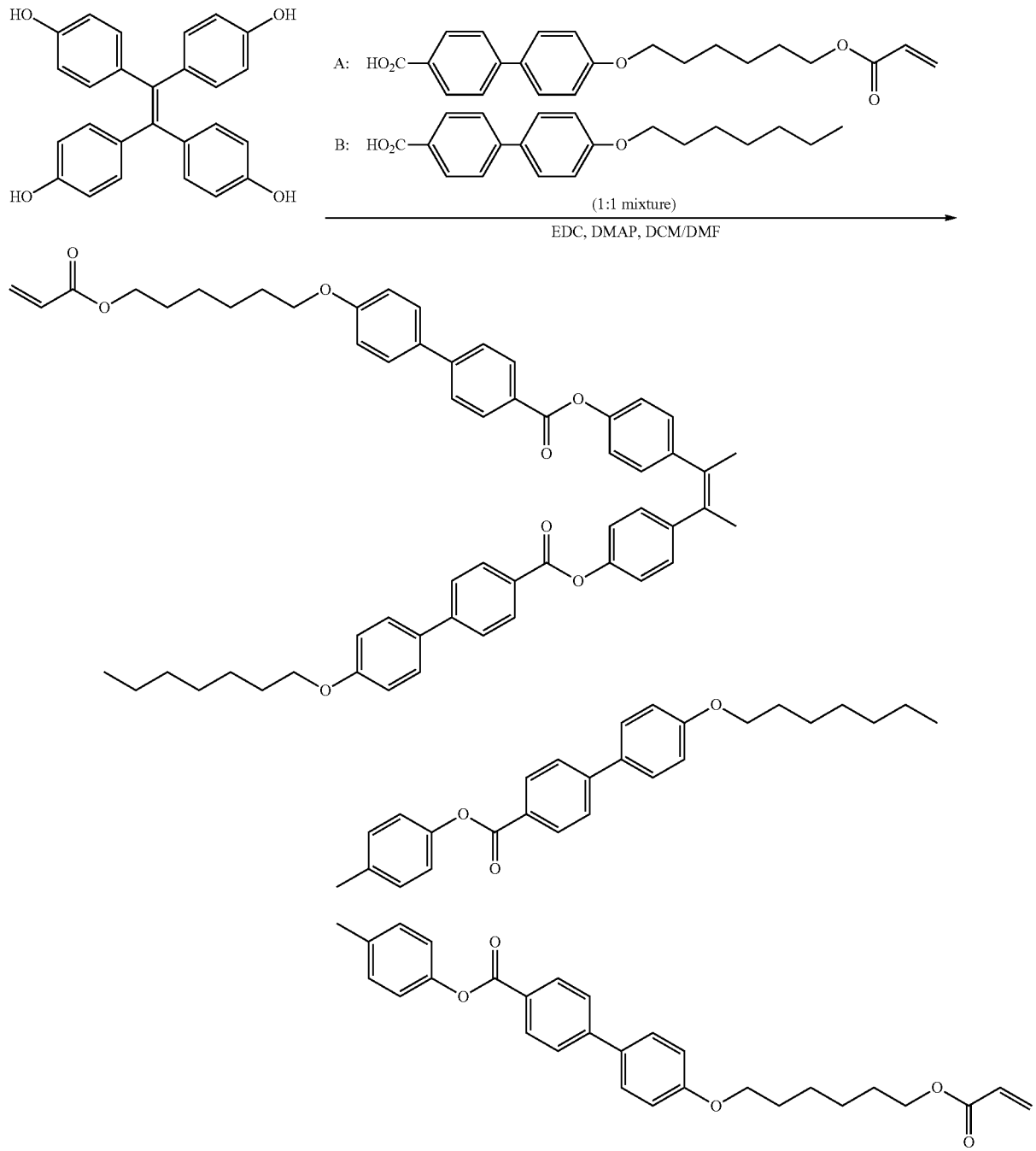

5.2 equivalent of EDC and 0.2 equivalent of DMAP were added to a solution in which 2.4 equivalent of 4-(4-heptyloxyphenyl)benzoic acid and 2.4 equivalent of 4-(4-acryloyloxyhexyloxyphenyl)benzoic acid were dissolved in DMF, and the solution was stirred for 30 minutes.

After adding the core compound synthesized in Synthesis Example was added to the mixture solution, the reaction was carried out for two days. The liquid crystal compound 2 was obtained by passing through the purification process same as in the method of Preparation Example 1.

$^1$HNMR (500 MHz, CDCl$_3$): δ 0.90 (t, 6H), 1.31~1.40 (m, 12H), 1.47~1.56 (m, 12H), 1.72 (m, 4H), 1.85 (m, 8H), 4.03 (m, 8H), 4.20 (t, 4H), 5.83 (dd, 2H), 6.14 (dd, 2H), 6.41 (dd, 2H), 7.00 (d, 8H), 7.08 (d, 8H), 7.19 (d, 8H), 7.60 (d, 8H), 7.68 (d, 8H), 8.13 (d, 8H).

Nematic phase temperature range: 175° C.~185° C.

Examples

Forming Optical Films

Example 1

Preparation of an Optical Film Using the Liquid Crystal Compound 1 According to Preparation Example 1

After coating a PVA alignment layer on a LDC glass, a pretilted alignment layer was prepared by rubbing the layer. A solution in which the liquid crystal compound 1 prepared in Preparation Example 1 and Irgacure651 were dissolved in methylethylketone was coated on the alignment layer by a bar coating method so as to prepare a film. The film was dried at 110° C. for 1 minute, and the optical film was obtained.

Example 2

Preparation of an Optical Film Using the Liquid Crystal Compound 2 According to Preparation Example 2

The optical film was prepared according to the same method as in Example 1, except that the liquid crystal compound 2 was used instead of the liquid crystal compound 1.

Experimental Example

Measurements for Thickness and Average Angle of Inclination β of the Optical Film The thickness of the optical films prepared according to Examples 1 and 2 was measured by using a micrometer (Mitutoyo Co. Ltd.), and the average angle of inclination β was measured by using Axoscan (Axometrics Co. Ltd.), an apparatus for polarization measurement. The results of the measurement were listed in the following Table 1.

TABLE 1

| | Thickness of Film (μm) | average angle of inclination β |
|---|---|---|
| Example 1 | 2.1 | 23° |
| Example 2 | 1.9 | 21° |

As shown in Table 1, the optical films prepared by using the liquid crystal compound or the liquid crystal composition including the same show the average angle of inclination β of 5° to 50° which is measured by using Axoscan, an apparatus for polarization measurement, and can minimize the change of color according to viewing angle, and thus they can be widely applied to the industrial field concerning the preparation of LCD device.

The preferable examples of the present invention are explained as disclosed above. However, the present invention is not limited to or by this, and numerous modifications and variations of the present invention are possible in light of the above teachings and the scope of the appended claims, and it is also included in the range of the present invention, obviously.

The invention claimed is:
1. A compound represented by the following Chemical Formula 1:

Chemical Formula 1

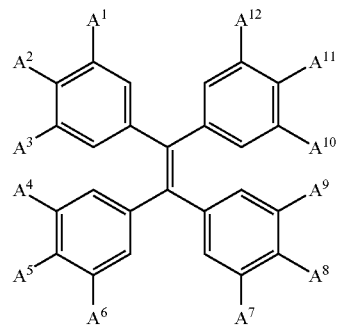

wherein,
$A^1$ to $A^{12}$ are independently —H or a substituent represented by chemical formula

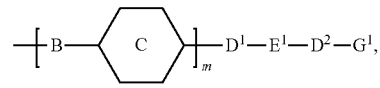

and at least one of $A^1$ to $A^{12}$ are a substituent represented by chemical formula

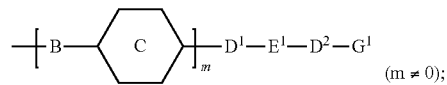

(m ≠ 0);

B is —O—, —NH—, —$(CH_2)_n$—, —$O(CH_2)_nO$—, —NH$(CH_2)_n$NH—, —$O(CH_2)_n$NH—, —NH$(CH_2)_nO$—, —CH=CH—, —C≡C—, —C(=O)O—, —OC(=O)—, or —C(=O)—, and n is an integer of 0~6;
ring C is

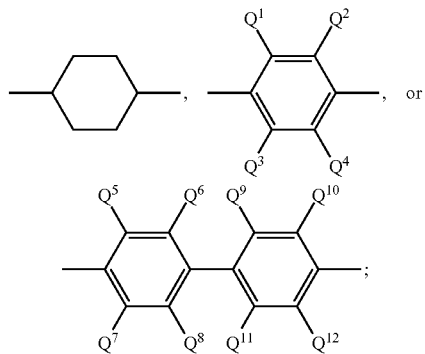

$Q^1$ to $Q^{12}$ are independently —H, —F, —Cl, —Br, —I, —CN, —$CF_3$, —OH, a $C_1$~$C_{12}$ alkyl, a $C_1$~$C_{12}$ alkoxy, or a substituent represented by chemical formula -$D^3$-$E^2$-$D^4$-$G^2$;
m is an integer of 0~2;
$D^1$, $D^2$, $D^3$, and $D^4$ are independently —O—, —NH—, or —$(CH_2)_p$—, and p is an integer of 0~5;
$E^1$ and $E^2$ are independently a $C_1$~$C_{12}$ alkylene, a $C_2$~$C_{12}$ alkenylene, —$(CH_2CH_2O)_q$—, —$(CH_2CHCH_3O)_q$—, or —$(CHCH_3CH_2O)_q$—, and q is an integer of 1~5;
$G^1$ and $G^2$ are independently —H, ring C is

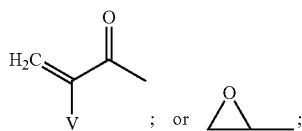; or 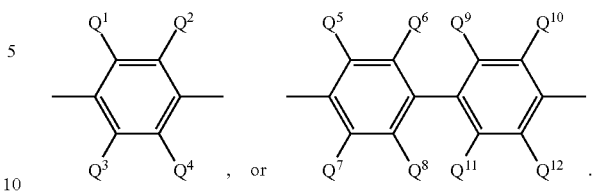;

and V is —H, —CH$_3$, —CH$_2$CH$_3$, —F, —Cl, —Br, or —CF$_3$.

2. The compound according to claim 1, wherein the C$_2$~C$_{12}$ alkenylene of E$^1$ and E$^2$ is —CH=CH—, —CH=CCH$_3$—, —CH$_2$CH=CH—, —CH=CHCH$_2$CH$_2$—, —CH$_2$CH=CHCH$_2$—, —CH$_2$CH$_2$CH=CH—, —CH=CHCH$_2$CH$_2$CH$_2$—, —CH$_2$CH=CHCH$_2$CH$_2$—, —CH$_2$CH$_2$CH=CHCH$_2$—, or —CH$_2$CH$_2$CH$_2$CH=CH—.

3. The compound according to claim 1, wherein the B is —OC(=O)—;

4. The compound according to claim 1, wherein A$^1$=A$^7$, A$^2$=A$^8$, A$^3$=A$^9$, A$^4$=A$^{10}$, A$^5$=A$^{11}$, and A$^6$=A$^{12}$.

5. The compound according to claim 4, wherein A$^2$=A$^8$, A$^5$=A$^{11}$, and A$^1$, A$^3$, A$^4$, A$^6$, A$^7$, A$^9$, A$^{10}$, and A$^{12}$ are —H.

6. The compound according to claim 4, wherein the compound is selected from the group consisting of:

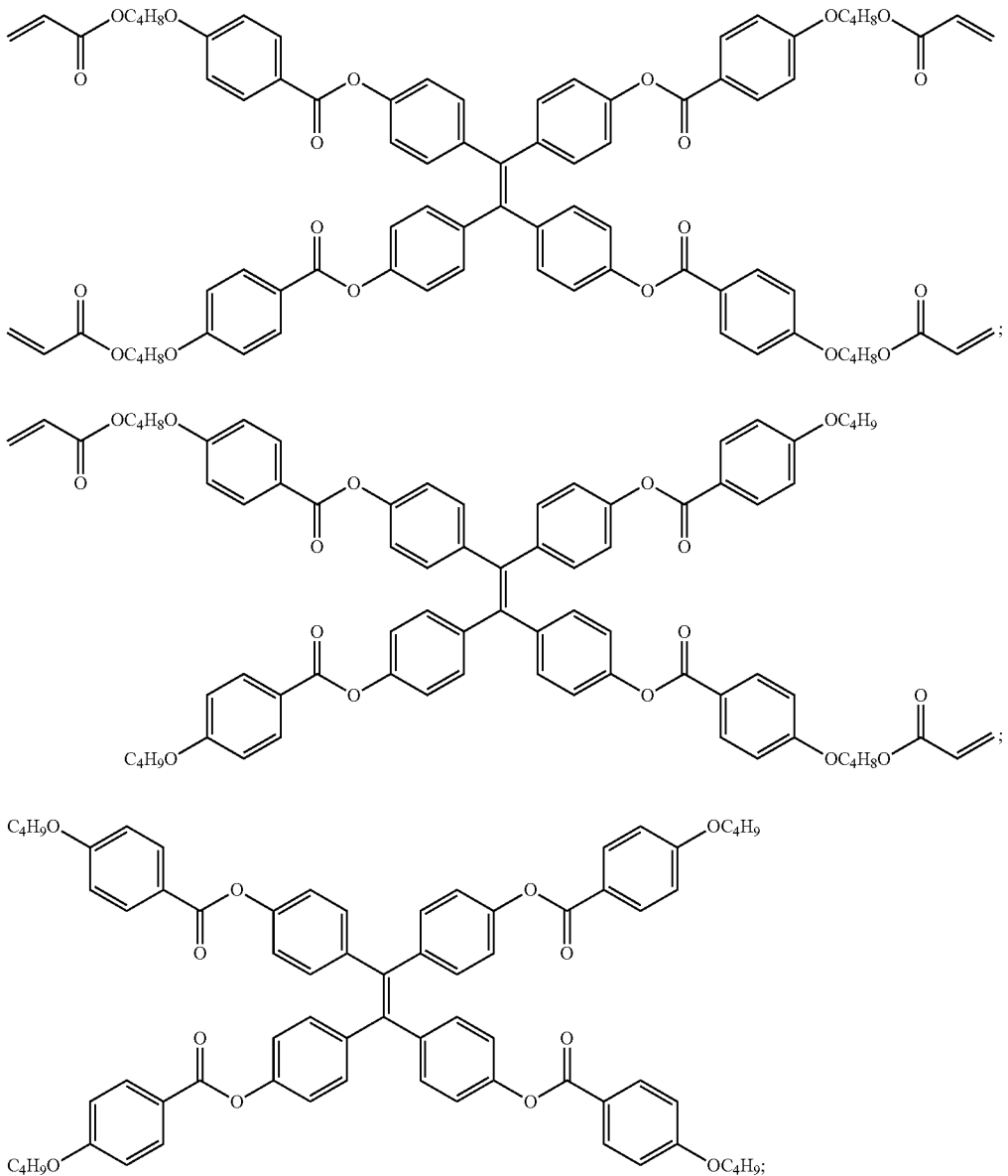

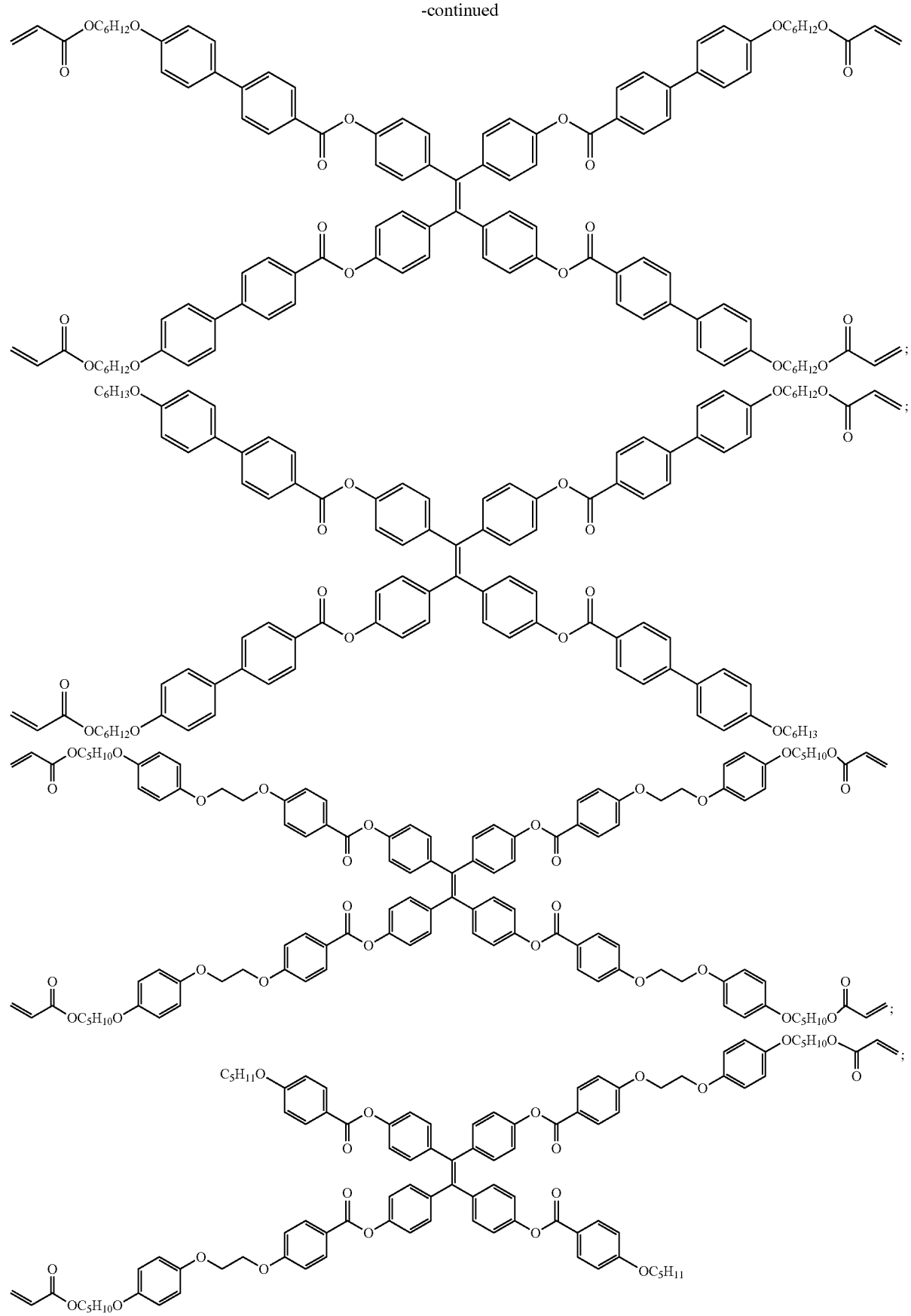

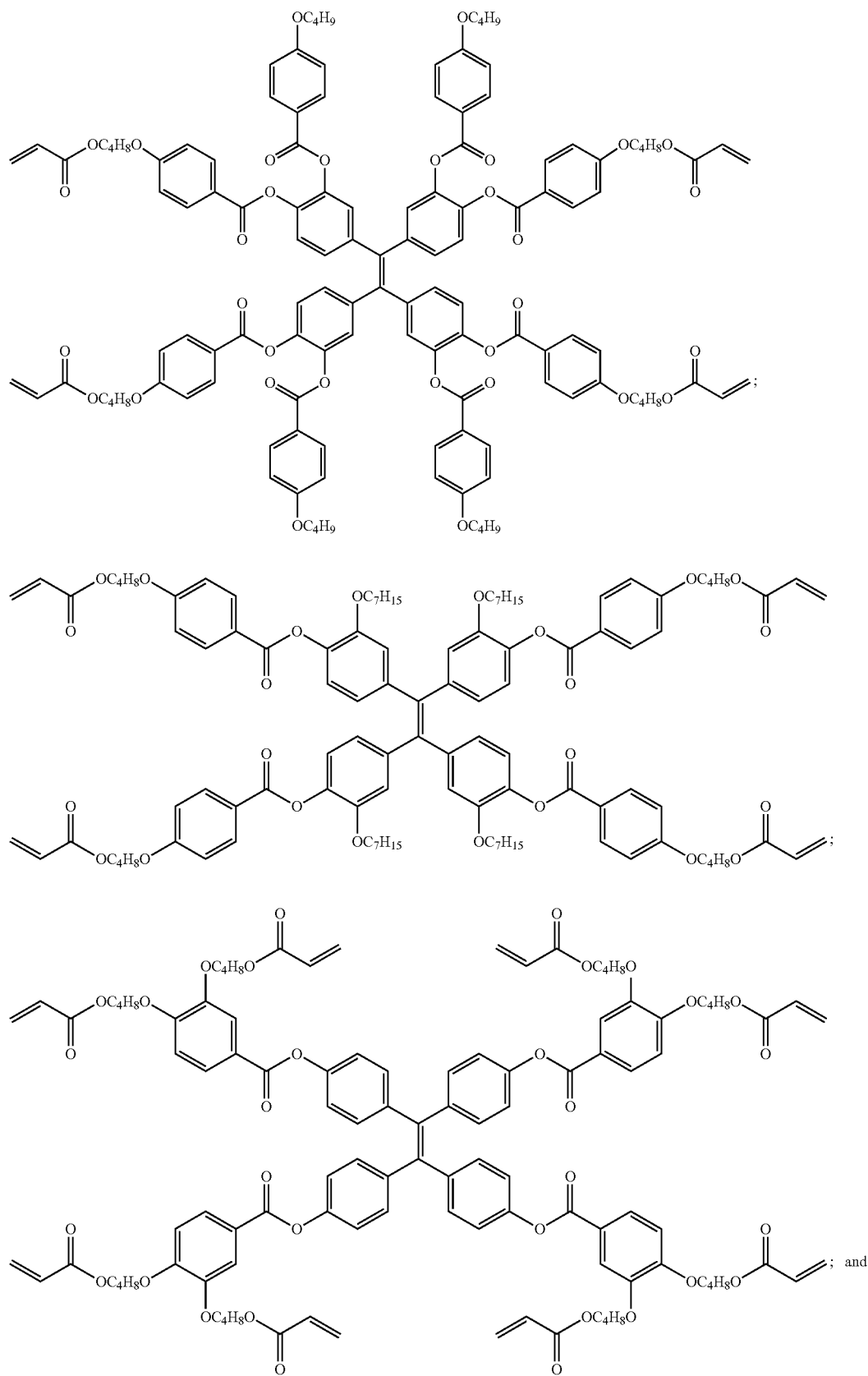

-continued

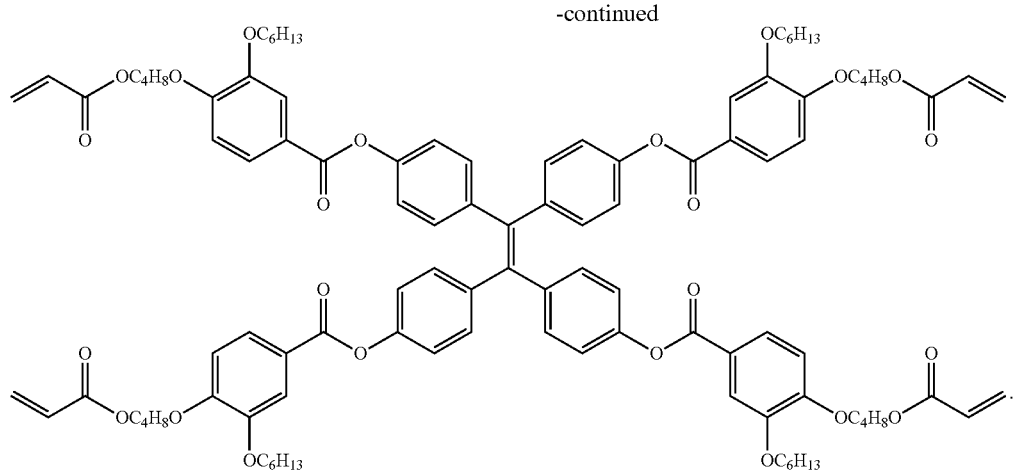

7. A method of preparing the liquid crystal compound represented by Chemical Formula 1 of claim 1, comprising the steps of:

preparing a compound represented by the following Chemical Formula 3 by reacting 2 molecules of a compound represented by the following Chemical Formula 2;

preparing a core compound represented by Chemical Formula 4 by substituting the alkoxy group of the compound represented by Chemical Formula 3 with hydroxyl group; and substituting the hydroxyl group of the core compound represented by Chemical Formula 4 with

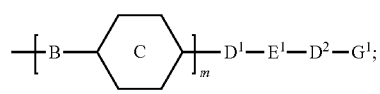

Chemical Formula 2

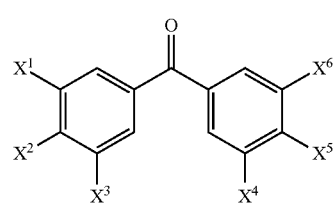

Chemical Formula 3

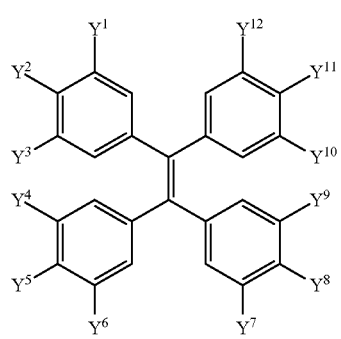

-continued

Chemical Formula 4

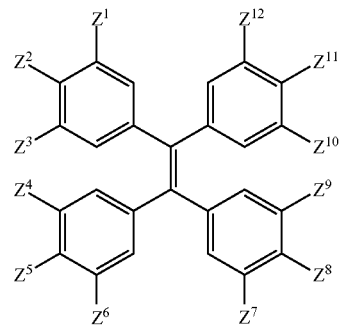

wherein, $X^1$ to $X^6$ of Chemical Formula 2 are independently hydrogen, or a $C_1$~$C_3$ alkoxy group, $Y^1$ to $Y^{12}$ of Chemical Formula 3 are independently hydrogen, or a $C_1$~$C_3$ alkoxy, and $Z^1$ to $Z^{12}$ are independently hydrogen, or hydroxyl group.

8. A liquid crystal composition, comprising at least one compound according to claim 1.

9. The liquid crystal composition according to claim 8, wherein the compound is included in an amount of 0.1 to 99.9 weight % in total liquid crystal composition.

10. The liquid crystal composition according to claim 8, wherein liquid crystal composition further comprises at least one compound selected from the group consisting of: a polymerizable liquid crystal compound having at least one functional group selected from the group consisting of vinyl group, vinyloxy group, acryl group, and methacryl group; a polymerizable non-liquid crystal compound having said functional group; and a polymer having said functional group.

11. The liquid crystal composition according to claim 8, wherein the liquid crystal composition comprises at least one photoreaction initiator selected from the group consisting of benzoyl ether, benzoyl isobutyl ether, benzoyl isopropyl ether, benzophenone, acetophenone, 4-benzoyl-4'-methyldiphenyl sulfide, benzylmethyl ketal, dimethylaminomethyl benzoate, 3,3'-dimethyl-4-methoxy benzophenone, methylbenzoyl formate, 2-methyl-1-(4-methylthio)phenyl)-2-morpholinylpropan-1-one, 2-benzyl-2-dimethylamino-1-(4-morpholinophenyl)-butan-1-one, 1-hydroxycyclohexyl phenyl ketone, and Irgacure series, in an amount of 0.001 to 20 parts by weight per 100 parts by weight of total liquid crystal composition.

12. The liquid crystal composition according to claim 8, wherein the liquid crystal composition further comprises an organic solvent, or a surfactant, or a mixture of the organic solvent and the surfactant.

13. A method of preparing an optical film, comprising the steps of: coating the liquid crystal composition according to claim 8 on a substrate; drying the substrate coated with the liquid crystal composition; and hardening the dried substrate.

14. The method according to claim 13, wherein the substrate comprises an alignment layer which is aligned before coating the liquid crystal composition on a substrate.

15. The method according to claim 13, wherein coating step is carried out with a spin coating method, a roll coating method, a printing method, a dip-drawing method, a curtain coating method, a die coating method, a dip coating method, or a bar coating method.

16. The method according to claim 13, further comprising an additional heating step after the drying step.

17. The method according to claim 13, wherein the hardening step is carried out by irradiating UV-ray of 20 mJ/cm$^2$ to 50 J/cm$^2$, or by heat-treating at the temperature of 10 to 200° C. for 3 seconds to 30 minutes.

18. A method of preparing an optical film, comprising the steps of: coating the liquid crystal composition according to claim 8 on a peelable film; drying the peelable film coated with the liquid crystal composition; forming a liquid crystal film by hardening the dried peelable film; and transferring the liquid crystal film to a substrate.

19. An optical film prepared by using the liquid crystal composition according to claim 8.

20. The optical film according to claim 19, wherein the optical film is a compensation film for a liquid crystal display.

21. The optical film according to claim 19, wherein the average angle of inclination β of the optical film measured by using Axoscan, an apparatus for polarization measurement, is 5° to 50°.

22. A liquid crystal display device, comprising the optical film according to claim 19.

23. The liquid crystal display device according to claim 19, wherein the device is selected from a TN mode display device, a STN mode display device, and an OCB mode display device.

* * * * *